(No Model.) 2 Sheets—Sheet 2.

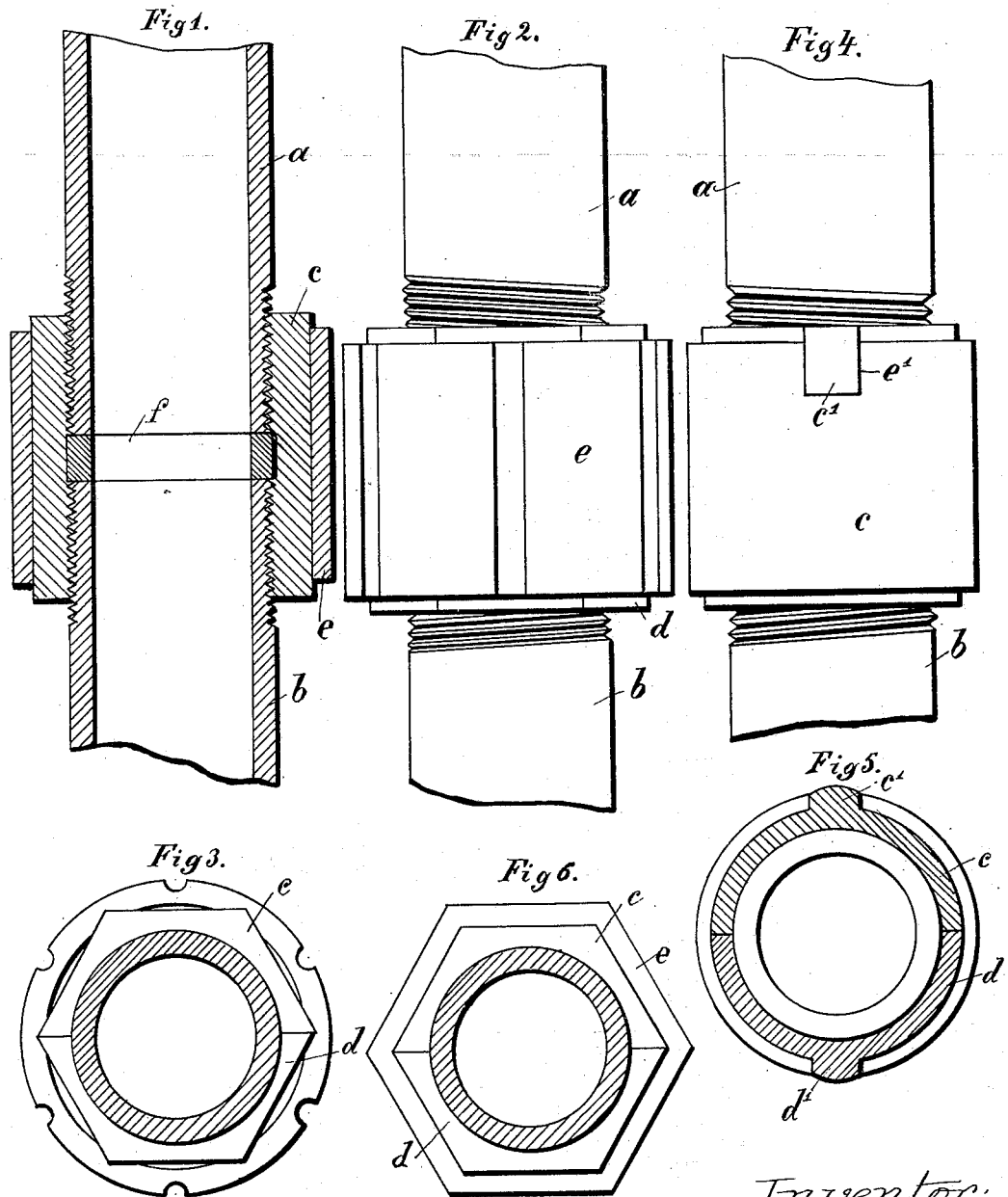

A. W. F. BENNIK.
TUBE COUPLING.

No. 604,224. Patented May 17, 1898.

Witnesses:
Harry Bailey
Frank S. Over

Inventor:
Arie W. F. Bennik
by Wm W Rosenbaum
ass'o att'y

UNITED STATES PATENT OFFICE.

ARIE WILLEM FREDERIK BENNIK, OF APELDOORN, NETHERLANDS.

TUBE-COUPLING.

SPECIFICATION forming part of Letters Patent No. 604,224, dated May 17, 1898.

Application filed September 12, 1896. Serial No. 605,683. (No model.)

*To all whom it may concern:*

Be it known that I, ARIE WILLEM FREDERIK BENNIK, of Apeldoorn, in the Kingdom of the Netherlands, have invented an Improved Pipe-Coupling, of which the following is a specification.

This invention relates to a pipe-coupling which consists, essentially, of a divided or split nut adapted to be slipped over the adjacent ends of the two lengths of pipe to be joined together and of a strap or sleeve adapted to hold the two parts of the divided nut together.

The improved coupling is illustrated in the accompanying drawings, in which—

Figures 1, 2, and 3 are views showing one form the invention may assume. Figs. 4 and 5 are views showing another form the invention may assume. Fig. 6 is a view of another modification. Figs. 7, 8, 9, 10, and 11 are views showing other modifications, Fig. 8 being a section on line $x\ x$, and Fig. 11 being a section on line $y\ y$, of Fig. 7.

Referring to Figs. 1, 2, and 3, the improved coupling consists of a nut formed in two parts $c$ and $d$ and adapted to be placed around or over the ends of the two lengths of pipe $a\ b$, which are provided with oppositely-directed screw-threads and which may have a packing-ring $f$ between them. In this arrangement the nut $c\ d$ has the form of a polygon—such, for instance, as a hexagon. Over or around this nut there is slipped a strap or sleeve $e$, so that the two parts of the nut are firmly held together. The fundamental shape of the strap in this modification is annular, and in the interior of the strap there are formed incisions or notches into which the corresponding corners of the two parts $c$ and $d$ engage, so as to prevent rotation of the parts.

The modification illustrated in Figs. 4 and 5 differs from the preceding arrangement in that the two halves $c$ and $d$ of the nut, which is of annular shape in this case, are provided with projections $c'$ and $d'$, which take into notches $e'$ in the strap, which is also of annular form.

The modification shown in plan by Fig. 6 differs from the preceding arrangement only by the angular form of the strap $e$, which is shaped to coincide with the exterior shape of the divided nut $c\ d$.

Figure 7:
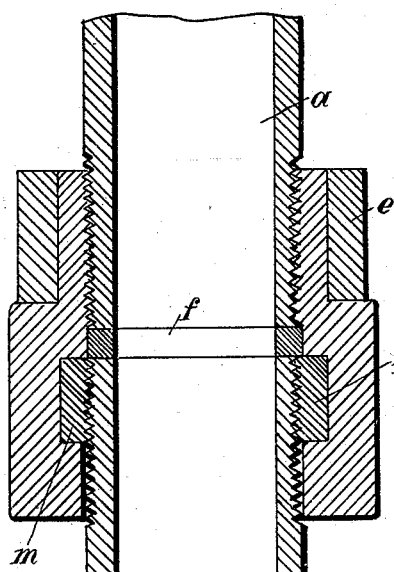
Figure 8:
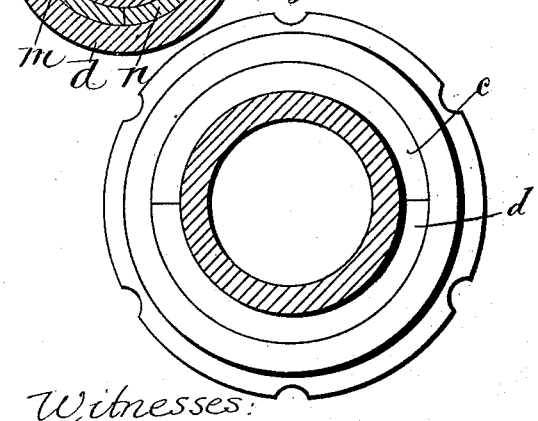

In the modification illustrated by Figs. 7 and 8 the ends of the two lengths of pipe $a$ and $b$ are provided with similarly-directed screw-threads, and the divided nut $c\ d$ engages with the end of one length of pipe only, the other end of the divided nut being recessed to receive an auxiliary divided nut $n\ m$.

Figure 9:
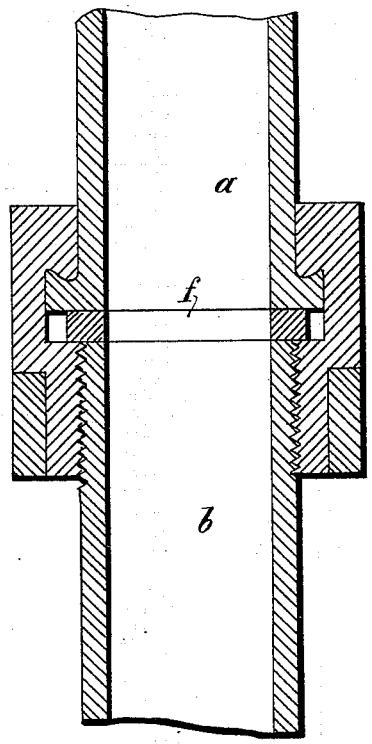
Figure 11:
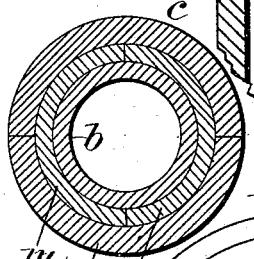
Figure 10:
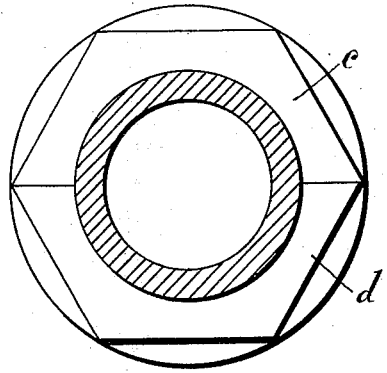

In the modification illustrated in Figs. 9 and 10 the auxiliary nut $n\ m$ is dispensed with and the end of the one length of pipe is provided with a flanged or turned-over edge which engages with a shoulder on the divided nut $c\ d$.

An obvious advantage of the construction of coupling described herein is the fact that it renders it possible to make a screw-threaded connection between two adjoining ends of a pipe and a connecting-coupling without the necessity of either screwing the coupling or pipes into place. The two parts of the coupling are simply placed upon the opposite sides of the adjoining ends of pipe and are then secured thereon by the surrounding sleeve.

What I claim is—

1. The combination with two ends of pipe provided with oppositely-directed screw-threads, of a divided nut placed around both of said ends and having corresponding threads and a strap or sleeve surrounding the nut, substantially as described.

2. The combination with two ends of pipe, of a main divided nut placed around the same, an auxiliary divided nut inclosed by the main nut and a sleeve surrounding the main nut, substantially as described.

In witness whereof I have hereunto set my hand in presence of two witnesses.

ARIE WILLEM FREDERIK BENNIK.

Witnesses:
 PEREPINE VARNALS,
 KATE STYLES.